United States Patent Office 3,442,820
Patented May 6, 1969

3,442,820
OLEFIN POLYMERIZATION CATALYST
PRETREATMENT
Steffen F. Dieckmann, Wilmington, Del., assignor to Hercules Incorporated, a corporation of Delaware
No Drawing. Filed Mar. 30, 1966, Ser. No. 538,561
Int. Cl. B01j 11/00, 11/78; C08f 3/02
U.S. Cl. 252—429                                    3 Claims The present invention relates to a process for improving a titanium trichloride polymerization catalyst and to the catalyst so produced.

The most commonly used catalysts for the polymerization of olefins such as ethylene and propylene contain titanium trichloride as the principal acting ingredient. The term "titanium trichloride catalyst" is used generically in the art to apply not only to pure titanium trichloride ($TiCl_3$) but also to compositions in which titanium trichloride is co-crystallized with an aluminum compound such as aluminum trichloride. One material sold commercially and referred to as titanium trichloride is made by reduction of $TiCl_4$ with metallic aluminum and is actually co-crystallized $3TiCl_3 \cdot AlCl_3$. Other compounds referred to as titanium trichloride can be prepared by reducing $TiCl_4$ with hydrogen, metallic titanium, or titanium monoxide. Another method of making titanium trichloride comprises reducing $TiCl_4$ with an organoaluminum compound such as a trialkylaluminum or an alkylaluminum halide. Here again, the product is not pure titanium trichloride but rather titanium trichloride co-crystallized with other materials such as with $AlCl_3$ or with $AlCl_3$ and an organoaluminum halide. In all of these processes, the titanium trichloride catalyst is obtained in the form of small particles ranging from about 20 to 50 microns in mean diameter.

In the typical polymerization of ethylene or propylene, the titanium trichloride catalyst, prepared by any of the above discussed methods, is activated with an organoaluminum compound, particularly a trialkylaluminum or a dialkylaluminum halide. In the past it has been necessary to use the titanium trichloride catalyst and organoaluminum compound in the polymerization in amounts corresponding to upwards of $4 \times 10^{-6}$ mole of titanium and $4 \times 10^{-6}$ mole of aluminum per gram of polymer produced. As the titanium trichloride catalyst and organoaluminum compound are relatively expensive materials, their use in such amounts contributes materially to the cost of the polymer. Moreover, when the catalyst is used in such amounts, it is necessary to purify the polymer by rather elaborate procedures which add still further to the cost of the polymer. It has long been a goal of the art to reduce the amount of catalyst consumed per unit of polymer produced, not only for the purposes of reducing the raw material cost but also to simplify the purification of the polymer.

It has been determined by prior investigators that if the olefin to be polymerized and the diluent in which the polymerization is to be conducted are extremely pure, it is possible to reduce very drastically the amount of titanium trichloride catalyst and organoaluminum compound, even to the point where the amount of these materials employed per unit of polymer produced is so small that purification of the polymer is rendered unnecessary, e.g., amounts in the range of from about $5 \times 10^{-8}$ to about $5 \times 10^{-7}$ mole of titanium and down to about $5 \times 10^{-7}$ mole of aluminum per gram of polymer can be tolerated without further purification.

It has been found, however, that in conducting polymerization of olefins such as ethylene and propylene in the presence of such small amounts of titanium trichloride catalyst and organoaluminum compound activator, an unexpected problem is encountered. This is the formation of loosely agglomerated bridges and webs of polymer particles which form within the reaction vessel between baffles and thermowells, baffles and vessel sidewalls, etc., in the polymerization vessel. These loose agglomerates grow during continuous polymerization to fill the entire volume of the polymerization apparatus so rapidly that it becomes necessary to discontinue the polymerization. The cause of this problem has finally been traced to the fact that, in the presence of the organoaluminum activator, a relatively high proportion of the titanium trichloride catalyst is soluble in the hydrocarbon diluent. The presence of a large proportion of the catalyst in solution form, with the polymer product precipitating from solution, is believed to contribute to the formation of polymer in this fibrous form, which readily forms skins, which in turn cause the bridging above referred to. The same phenomenon does not occur at higher concentrations of titanium trichloride catalyst because the solubility of the catalyst is such that a much smaller proportion of the catalyst is dissolved and, accordingly, a much smaller proportion of the fibrous, skin forming material is formed.

Now, in accordance with the instant invention, a process has been found whereby an olefin polymerization catalyst can be prepared which affords excellent yields of polymer per unit of catalyst while avoiding the disabling problems encountered with prior art catalysts. Specifically, this invention provides a process whereby the catalyst is treated, prior to charging the same to the polymerization equipment, to decrease its hydrocarbon solubility and to remove from the polymerization environment all the dissolved catalyst. This process comprises slurrying a titanium trichloride catalyst in a solution of an organoaluminum catalyst activator, reacting therewith a small amount of ethylene sufficient to render the titanium trichloride substantially insoluble in hydrocarbon liquid, washing the treated catalyst with an inert organic liquid, and thereafter separating the supernatant liquid, and recovering the treated catalyst particles. The process is believed to result in formation of a low polymer of the treating monomer on the surface of the catalyst particles.

The titanium trichloride catalyst can be any of the materials referred to previously which are either true $TiCl_3$ or the complex cocrystals which are referred to as titanium trichloride for reasons of convenience. However, the preferred materials for use in olefin polymerization, and thus the preferred materials for use in the instant invention are those prepared by the reduction of $TiCl_4$ with organoaluminum compounds, particularly the alkylaluminum dihalides and sesquihalides. Preferably, the catalyst is prepared by the reaction of 0.5 to 4.0 moles of the organoaluminum compound with 1.0 mole of $TiCl_4$. The product of this reaction is a solid crystalline precipitate.

The titanium trichloride catalyst is slurried in an aliphatic liquid hydrocarbon solution of an organoaluminum activator compound to effect the treatment with the ethylene. In general, the amount of activator should be at least about 0.5 mmole per mmole of titanium present in the slurry. While there is no critical upper limit, it is preferred to have amounts of activator no greater than about 2.0 mmole per mmole of titanium. Since the presence of the activator sometimes increases the solubility of the titanium trichloride, there is an economic factor favoring the lowest feasible activator concentration.

In the treatment of the catalyst with ethylene, conditions are employed similar to those which are normally employed in polymerizing ethylene, i.e., moderately elevated temperature and pressure. Generally, the temperature will be on the order of about 20 to 80° C., although precise control is not normally required. In carrying out the process of the invention, gaseous ethylene is fed to the treatment vessel at a measured rate until about 0.25 to 2.50 grams of ethylene per millimole of titanium have been fed. Ethylene partial pressure during this operation is not critical. Ethylene addition is discontinued at this point and reaction is permitted to continue until a constant pressure is reached, indicating that reaction has stopped.

Following the completion of the ethylene treatment, the treated catalyst is separated from the hydrocarbon and activator solution, washed with at least one aliquot of fresh hydrocarbon liquid and then immersed in fresh hydrocarbon for storage.

The catalyst treating medium, due to the presence therein of the dissolved organoaluminum activator compound, contains a certain proportion of the titanium trichloride dissolved therein. This material does not undergo or is not affected by the treatment according to the present invention. By separating the treated catalyst particles from the treating liquid, this dissolved material is removed and discarded. The treated particles are then returned to a hydrocarbon suspending medium and are found to be substantially insoluble therein, even in the presence of relatively high concentrations of activator. Thus, when a polymerization is carried out with the treated catalyst, little or none of the same becomes dissolved in the reaction medium.

The invention having been set forth in some detail, it will now be exemplified by the following illustrative examples. Parts and percentages are by weight unless otherwise specified.

Examples 1–6

A titanium trichloride catalyst was prepared by dissolving 1.2 moles of ethyl aluminum sesquichloride in 2 liters of n-heptane at 0–4° C. with agitation under a nitrogen blanket. To this solution, one mole of $TiCl_4$ was added dropwise over a period of 4 hours while maintaining the temperature at about 0–4° C. The sesquichloride consisted of 0.6 mole of diethylaluminum chloride and 0.6 mole of ethylaluminum dichloride. Then the reaction mixture was heated to 90° C. over a 4-hour period and stirred at 90° C. for 4 hours. The product resulting from this reaction was separated by decantation, washed well by decantation with fresh heptane and stored in heptane under nitrogen until used.

The solubility of the thus prepared titanium trichloride was determined by agitating 1.4 mmole portions of the same in one-liter portions of solutions of 2 mmoles of aluminum triethyl or diethylaluminum chloride per liter of heptane for about one hour at about 80° C. Each of these slurries was allowed to settle overnight at 80° C., and each clear supernatant liquid was analyzed for titanium.

Solubility data corresponding to the various activators with untreated catalysts are shown as controls in the table below.

The titanium trichloride catalyst prepared above was then subjected to ethylene treatments by the following procedure. A quantity of the catalyst crystals sufficient to contain 50 mmoles of titanium was slurried in one liter of a 50 mmolar solution of diethylaluminum chloride in heptane under a nitrogen atmosphere. The slurry was heated with agitation to 80° C. over a twenty-minute period. When the temperature was stabilized at about 80° C., ethylene gas was fed through a rotometer into the polymerization vessel at 100 g./hr.

In one trial, ethylene was fed for the time interval calculated to introduce 0.25 g. $C_2H_4$/mmole of titanium, in the second trial long enough to introduce 2.50 g./mmole. Then the feed was discontinued and agitation maintained at 80° C. until all reaction stopped, as indicated by a leveling out of the pressure in the vessel. In each trial, ethylene uptake was checked by weighing the reaction vessel before and after feeding ethylene. The ethylene-treated catalyst was separated from the diluent by decantation, then washed by decantation with another portion of heptane.

Solubility of the treated catalyst in activator solutions (concentration of 2.0 millimoles per liter) was determined by the same technique described for determining that of the untreated catalyst. Data for these determinations are set forth in the following table.

| Example No. | Ethylene treatment (g./mm. titanium) | Activator | Ti solubility (mm./liter) |
|---|---|---|---|
| Control | None | None | 0.022 |
| 1 | 0.28 | ....do.... | <0.01 |
| 2 | 2.36 | ....do.... | <0.006 |
| Control | None | $Et_3Al$ | 0.027 |
| 3 | 0.28 | $Et_3Al$ | <0.01 |
| 4 | 2.36 | $Et_3Al$ | <0.005 |
| Control | None | $Et_2AlCl$ | 0.013 |
| 5 | 0.28 | $Et_2AlCl$ | <0.01 |
| 6 | 2.36 | $Et_2AlCl$ | 0.015 |

As the data in the table show, the solubility improvement is not the same with each activator, but depends upon the activator used and the level of ethylene treatment. In all cases, however, an optimum treatment level can be found where solubility is reduced to an effective working range. Within this range of treatment, highly effective catalyst are prepared.

Example 7

Continuous polymerization of ethylene in n-heptane was conducted in a stainless steel stirred tank reactor. Catalyst, prepared as described in Examples 1 to 6, but not treated with ethylene, was used together with $(C_2H_5)_2$AlCl or $(C_2H_5)_3$Al activator. The range of operating conditions was as follows:

Temperature _____ ° C__ 80
Ethylene partial pressure _____ atm__ 10–18
Activator concentration _____ mm__ 0.2–0.9
Catalyst concentration _____ mm__ 0.02–0.13
Polymerization rate (g. ethylene/liter heptane/hour) _____ 14–41
Average residence time of slurry in reactor _____ hours__ 3.1–3.7

Continuous operation was always cut short by the formation of "skins" and fiber which plugged reactor outlets and prevented agitation of the reactor mixture. In twenty-five trials, the average running time before skins and fiber formation halted operation was about 8 hours and 45 minutes with no run lasting more than 23 hours.

After this record of performance was established, catalysts pretreated with ethylene as described for Examples 1 to 6 were used in the same reactor. Pretreatment levels were 0.28, 1.6, 1.7, 2.2 and 2.4 g. $C_2H_4$ per mmole titanium. The distribution of running time in 15 runs under the same range of polymerization conditions as were employed with the untreated catalyst was as shown in the following table. Runs were discontinued when the slurry became unstirrable due to either the nature or concentration thereof. The data clearly show that longer running times are gained by pretreating the catalyst with ethylene.

| Treatment level | No. of runs | Average running time (hrs.) |
|---|---|---|
| 0.28 | 3 | 11 |
| 1.60 | 1 | 13 |
| 1.70 | 5 | 17 |
| 2.20 | 3 | 28 |
| 2.40 | 3 | 46 |

The pretreatment of the catalysts according to the instant invention has also been found to have a helpful effect upon the metering thereof to the reaction vessel. In the past, metering of the catalyst to the reaction vessel during a continuous polymerization has proven to be a difficult problem. The polymer particles of the prior art are of relatively great density. Accordingly, they tend to settle out of suspension in the storage tank awaiting use. In order to maintain the suspension, relatively vigorous agitation, circulation, or the like, is required. However, the untreated particles are also quite friable and tend to diminish in particle size until practically colloidal size particles remain. Such fine size particles produce colloidal size polyolefin particles which are difficult to work with upon completion of the polymerization. By the process of this invention, both of these difficulties are relieved, leading to a significant improvement in metering precision of the catalyst. The coating on the surface of the particles causes a substantial decrease in their density, so that they exhibit less tendency to come out of suspension, thus lessening the amount of agitation required. In addition, the treated particles are much less friable, and accordingly are less subject to attrition resulting from the agitation.

What I claim and desire to protect by Letters Patent is:

1. A process for pretreating titanium trichloride to enhance its usefulness as a catalyst for the polymerization of olefins by reducing its solubility in the polymerization medium which comprises slurrying titanium trichloride in a solution of an organoaluminum compound in an inert liquid hydrocarbon reacting therewith at a temperature of about 20–80° C. an amount of ethylene sufficient to render the dispersed titanium compound substantially insoluble in said solution, and thereafter separating the treated titanium trichloride, washing the same at least once with an inert liquid hydrocarbon and recovering the treated titanium trichloride particles.

2. A process according to claim 1 where the titanium trichloride is prepared by the reaction of titanium tetrachloride with an alkylaluminum sesquihalide.

3. The process of claim 2 where the treatment is effected at a level of 0.025 to 2.5 grams of ethylene per millimole of titanium trichloride.

References Cited

UNITED STATES PATENTS

| | | | |
|---|---|---|---|
| 2,977,350 | 3/1961 | Fasce | 260—94.9 |
| 2,967,176 | 1/1961 | Pilar | 260—94.9 |
| 2,956,994 | 10/1960 | Peterlein | 260—94.9 |
| 2,936,302 | 5/1960 | Jones | 260—93.7 |
| 2,996,459 | 8/1961 | Anderson | 252—429 |
| 3,215,682 | 11/1965 | Farrar | 260—94.3 |
| 3,030,350 | 4/1962 | Jong | 260—94.9 |

PATRICK P. GARVIN, *Primary Examiner.*

U.S. Cl. X.R.

252—441; 260—93.7, 94.9